United States Patent [19]
Alberts

[11] Patent Number: 6,012,616
[45] Date of Patent: Jan. 11, 2000

[54] BOTTLE ASSEMBLY

[76] Inventor: Scott Alberts, 3074 Lima St., Burbank, Calif. 91504

[21] Appl. No.: 09/134,728

[22] Filed: Aug. 17, 1998

[51] Int. Cl.[7] .................................................... A47G 19/00
[52] U.S. Cl. ........................ 222/465.1; 222/468; 222/475; 222/568
[58] Field of Search ................................. 222/465.1, 475, 222/468, 568

[56] References Cited

U.S. PATENT DOCUMENTS

| 308,106 | 11/1884 | Stimpson | 222/468 |
|---|---|---|---|
| 1,556,150 | 10/1925 | Kuck | 222/468 |
| 3,591,060 | 7/1971 | Nakanura | 222/475 |

FOREIGN PATENT DOCUMENTS 278633  2/1970  Austria .............................. 222/465.1

*Primary Examiner*—Steven A. Bratlie
*Attorney, Agent, or Firm*—James E. Brunton

[57] ABSTRACT

A bottle assembly for use in the convenient storage and dispensing of beverages of the character used in restaurants and bars to make mixed drinks. The bottle assembly is compact, easy to use, and permits the smooth dispensing of the beverage contained within the container portion of the assembly in a rapid and efficient manner. Additionally, the bottle assembly embodies a unique handle design for gripping by the user which enables beverages to be poured from the container in an ergonomically sound manner so that undue stresses on the hand and wrist of the user are substantially avoided.

17 Claims, 2 Drawing Sheets

BOTTLE ASSEMBLY

BACKGROUND OF THE INVENTION

1. Field of the Invention

The present invention relates generally to fluid dispensing containers. More particularly, the invention concerns a uniquely designed beverage dispensing container which is ideally suited for use by bartenders in dispensing beverages used in mixing mixed drinks.

2. Discussion of the Prior Art

Various types of container tops have been suggested in the past to improve the pouring of liquid contents of the container. One type of container top frequently used by bartenders comprises a top having an upwardly extending, generally conically shaped portion which has at its upper extremity a pour opening for dispensing the liquid contained within the container to which the top is interconnected. While this type of dispensing container is adequate for the purpose, it exhibits a number of drawbacks. For example, the prior art containers of this type are generally quite tall, are awkward to store and tend to be somewhat unwieldable during use. Not only is the dispensing operation cumbersome, it is also ergonomically unsound since it tends to place undue stresses on the wrists of the user after extended periods of time.

The apparatus of the present invention overcomes most of the drawbacks of the prior art dispensing containers by providing a dispensing container which includes a uniquely curved, upwardly extending gripping handle that can be comfortably gripped by the bartender in a manner to enable easy pouring without placing undue stresses on the user's arms and wrist. Another benefit of the apparatus of the present invention is the novel configuration and strategic location of the pouring spout which is provided on the container closure. Additionally a venting hole is provided in the container closure which enables the liquid to be poured rapidly from the container body.

These and other important features of the apparatus of the present invention will be better understood from the discussion which follows.

SUMMARY OF THE INVENTION

It is an object of the present invention to provide a novel bottle assembly for use in the convenient storage and dispensing of beverages of the character used in restaurants and bars to mix drinks. More particularly it is an object of the invention to provide such a container which is compact, easy to use, and permits smooth and rapid pouring of the beverage contained within the container portion of the assembly in an efficient manner.

Another object of the invention is to provide a bottle assembly of the character described which embodies a unique handle design for gripping by the user which enables beverages to be poured from the container in an ergonomically sound manner so that undue stresses on the hand, arm and wrist of the user are substantially reduced.

Another object of the invention is to provide a bottle assembly which is shorter and more compact than typical prior art beverage assemblies thereby making it more efficient to store and use in typical bar tendering operations.

Another object of the invention is to provide a bottle assembly of the character described in the preceding paragraphs which is specially designed to mitigate against accidental spills of beverages contained within container body of the assembly. More particularly, it is an object of the invention to provide a bottle assembly which includes a unique handle that is affixed to the container lid that can be quickly, easily and comfortably grasped by the user.

Another object of the invention is to provide a bottle assembly of the class described which can be injection molded in high volume at relatively low cost.

Another object of the invention is to provide a bottle assembly as described in the preceding paragraphs which is extremely durable and easily cleaned.

DESCRIPTION OF THE INVENTION

Figure 1:
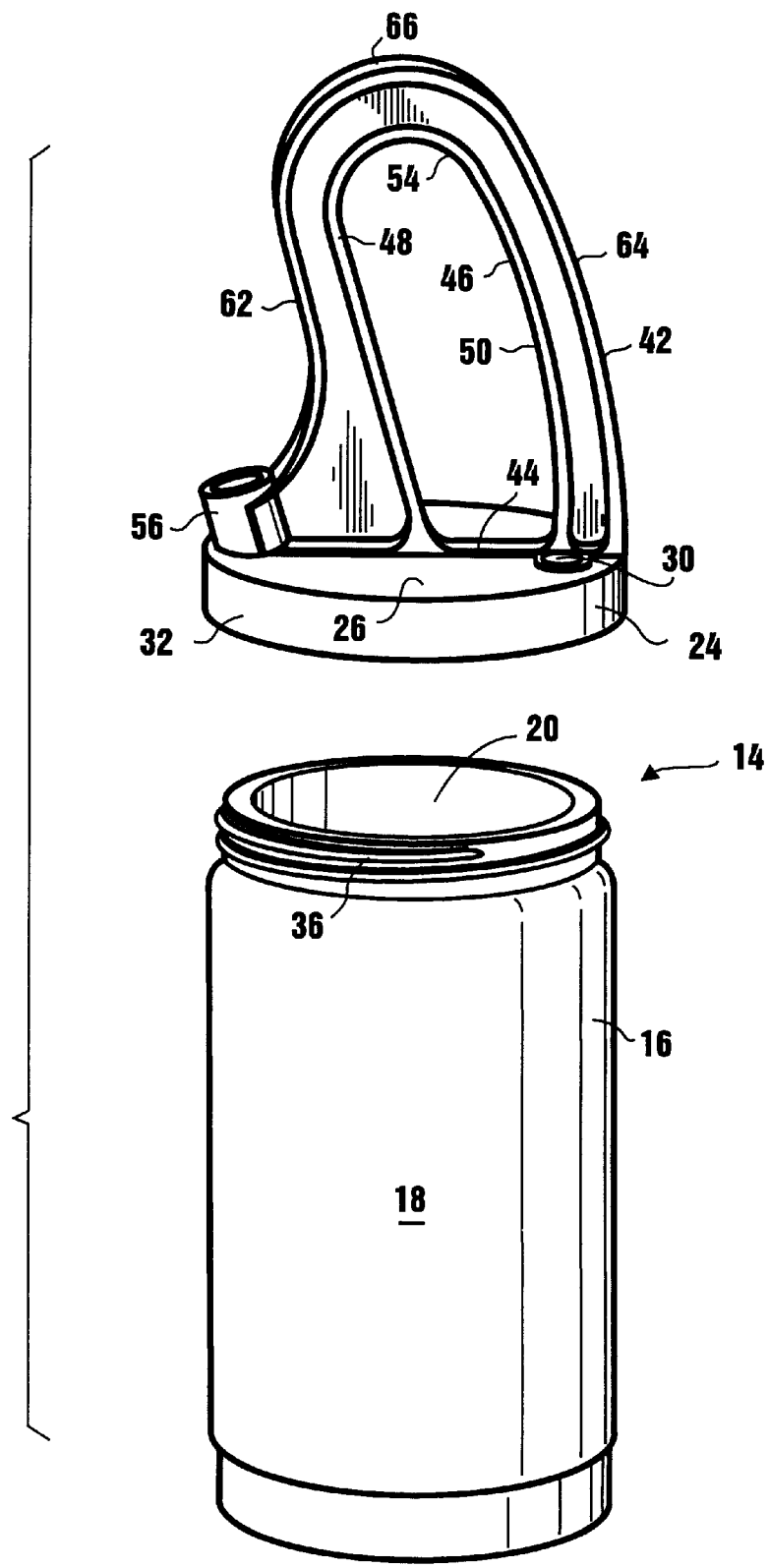
FIG. 1 is a generally perspective exploded view of one form of the bottle assembly of the present invention for use in dispensing beverages.
Figure 3:
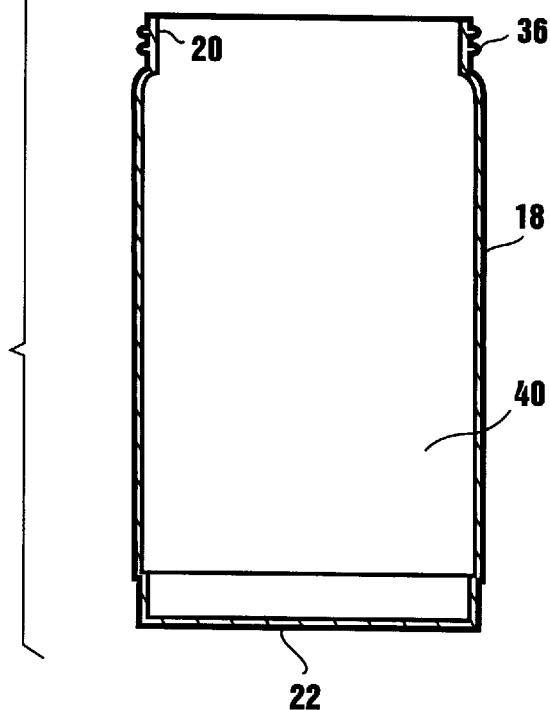
FIG. 3 is exploded side elevational cross sectional view of the bottle assembly shown in FIG. 1.

Referring to the drawings and particularly to FIGS. 1 and 3, one form of the bottle assembly of the present invention is there illustrated and generally designated by the numeral 14. In this form of the invention the bottle assembly comprises a container 16, for containing the beverage to be dispensed. Container 16 includes a generally cylindrically shaped wall 18 which defines an open top 20. The bottom of container 16 is closed by a bottom closure wall 22. (FIG. 3)

Figure 2:
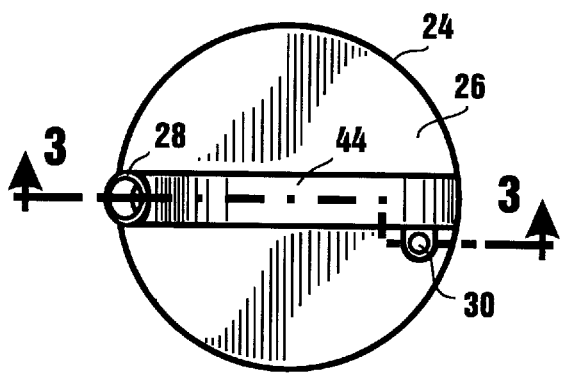
FIG. 2 is a top view of the bottle assembly of the invention.
Figure 2:
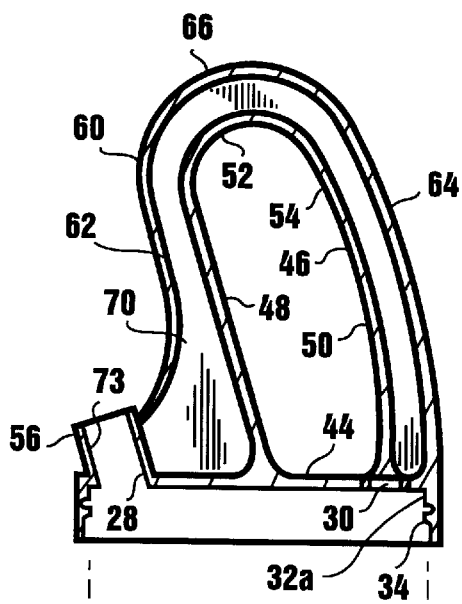

Closure means is provided for closing the open top of the beverage container and here comprises a closure member 24 which is generally cap like in configuration. Closure member 24 includes a top wall 26 having first and second openings 28 and 30 formed therein. (See also FIG. 2) Extending downwardly from top wall 26 is a generally cylindrically shaped flange 32 which circumscribes top wall 26 in the manner shown in FIG. 1. Flange 32 has an inner wall 32a (FIG. 3), which is provided with threads 34 which are mutable with exterior threads 36 provided on wall 18 of container 16. With this construction, the closure means, or closure member 24, can be th readily interconnected with container 16 in a manner to sealably contain fluids within reservoir 40 of container 16. (FIG. 3)

Forming an important aspect of the apparatus of the present invention is a combination handle and pour spout assembly 42 which is connected to top wall 26 of the closure means, or closure member 24. In the present form of the invention, assembly 42 comprises a base 44 to which is attached a generally "U" shaped member 46. Member 46 includes first and second legs 48 and 50 which are connected to a bight portion 52. (FIG. 3) Bight portion 52, along with first and second legs 48 and 50, cooperate to define a finger receiving opening 54 which is specially designed to receive three or four fingers of one hand of the user of the assembly.

A generally cylindrically shaped, upstanding pour spout 56 is connected to base 44 proximate first leg 48. Pour spout 56 is strategically positioned so as to be in alignment with opening 28 provided in top 26. To improve the pouring efficiency of the apparatus, pour spout 56 uniquely extends at an obtuse angle with respect with respect to top wall 26 of the closure member. Also forming an important aspect of the combination handle and pour spout assembly 42 is a second generally "U" shaped member 60 which is connected to base 22. Member 60 includes first and second legs 62 and 64 which are connected to a bight section 66. As best seen by referring to FIG. 3, first leg 62 is curved downwardly and outwardly so as to terminate at a location proximate pour spout 56.

Disposed between the curved portion of first leg 62 and leg 48 of the first generally "U" shaped member is a support panel 70 which, as shown in FIG. 3, is generally triangular in shape. The lower portion of panel 70 is disposed between pour spot 56 and the lower portion of leg 48. With this novel construction, panel 70 presents a pleasing ornamental appearance and also provides structural integrity to the handle portion of the apparatus.

In using the apparatus of the invention, after reservoir 40 has been filled with the appropriate beverage to be dispensed, the closure assembly is threadably interconnected with the body portion 18 of the container. Threads 34 and 36 are toleranced so as to provide a tight liquid seal between the closure means and the body portion of the beverage container so that liquid will not spill from reservoir 40 between the container body and flange 32. With the beverage container filled with the appropriate beverage and with the closure means sealably attached thereto, the user can comfortably grip the assemblage thus formed by inserting the fingers of one hand into finger receiving opening 54. This causes the leg 64 of the second generally "U" shaped member to comfortably nest within the palm of the user's hand. When the assemblage is then raised and tilted forward, much in the nature of the motion used to pour tea from a tea pot the beverage contained within reservoir 40 will smoothly and rapidly flow through the opening 73 provided in spout 56. In this regard it should be noted that second opening 30 functions as a vent means or vent port for venting to atmosphere air trapped within reservoir 40.

Because the assemblage of the handle closure means and beverage container is quite compact, the apparatus can be easily stored in relatively small spaces. Due to the novel configuration of the gripping handle portion of the apparatus, the assemblage can be securely gripped by the user so that the beverage contained within reservoir 40 can be quickly and comfortably poured from the container through spout 56.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made with out departing from the scope and spirit of the invention, as set forth in the following claims.

I claim:

1. A bottle cap for use in closing a bottle having a wall defining an open top, said wall having threads, said bottle cap comprising:
   (a) a closure member for closing the open top of the bottle comprising:
      (i) a top wall having a first opening; and
      (ii) a downwardly extending flange circumscribing said top wall, said flange having an inner wall provided with threads matable with the threads on the wall of the bottle; and
   (b) a combination handle and pour spout assembly connected to said top wall of said closure member comprising:
      (i) a base;
      (ii) a generally "U" shaped first member connected to said base, said member having first and second spaced apart legs connected to a bight portion, said first and second legs and said bight portion cooperating to define a finger receiving opening for receiving the fingers of the user;
      (iii) a generally cylindrically shaped, upstanding pour spout connected to said base proximate said first leg of said handle, said pour spout being in alignment with said opening provided in said top.

2. A bottle cap as defined in claim 1 in which said pour spout extends upwardly at an obtuse angle with respect to said top wall of said closure member.

3. A bottle cap as defined in claim 1 in which said combination handle and pour spout further includes a generally triangular shaped reinforcement panel disposed between said pour spout and said first leg of said first generally "U" shaped member.

4. A bottle cap as defined in claim 3 in which said combination handle and pour spout further comprises a second generally "U" shaped member connected to said base and circumscribing said first "U" shaped member and said reinforcement panel.

5. A bottle cap as defined in claim 4 in which said second generally "U" shaped member includes first and second legs connected to a bight member, said first leg being curved outwardly and terminating proximate said pour spout.

6. A bottle cap for use in closing a bottle having a wall defining an open top, said wall having threads, said bottle cap comprising:
   (a) a closure member for closing the open top of the bottle comprising:
      (i) a top wall having a first and second openings; and
      (ii) a downwardly extending flange circumscribing said top wall, said flange having an inner wall provided with threads matable with the threads on the wall of the bottle; and
   (b) a combination handle and pour spout assembly connected to said top wall of said closure member comprising:
      (i) a base;
      (ii) a generally "U" shaped first member connected to said base, said member having first and second spaced apart legs connected to a bight portion, said first and second legs and said bight portion cooperating to define a finger receiving opening for receiving the fingers of the user;
      (iii) a generally cylindrically shaped upstanding pour spout connected to said base proximate said first leg of said handle, said pour spout being in alignment with a opening provided in said top and extending at an obtuse angle with respect to said top; and
      (iv) a generally triangular shaped reinforcement panel connected to said base and disposed between said pour spout and said first leg of said first generally "U" shaped member.

7. A bottle cap as defined in claim 6 in which said combination handle and pour spout further comprises a second generally "U" shaped member connected to said base and circumscribing said first "U" shaped member and said reinforcement panel, said second generally "U" shaped member being spaced apart from said first generally "U" shaped member.

8. A bottle cap as defined in claim 7 in which said second generally "U" shaped member includes first and second legs connected to a bight member, said first leg being curved outwardly and terminating proximate said pour spout.

9. A bottle cap as defined in claim 8 in which both said closure member and said combination handle and pour spout are formed form an injection moldable plastic material.

10. A bottle cap as defined in claim 9 in which said base of said combination handle and pour spout assembly is bonded to said top wall of said closure member.

11. A bottle assembly for use in dispensing beverages, comprising:
- (a) a container for containing the beverage to be dispensed comprising a wall defining and open top, said wall having thread formed thereon;
- (b) a closure member for closing the open top of the container comprising:
  - (i) a top wall having a first and second openings; and
  - (ii) a downwardly extending flange circumscribing said top wall, said flange having an inner wall provided with threads matable with the threads on the wall of said container; and
- (c) a combination handle and pour spout assembly connected to said top wall of said closure member comprising:
  - (i) a base;
  - (ii) a generally "U" shaped first member connected to said base, said member having first and second spaced apart legs connected to a bight portion, said first and second legs and said bight portion cooperating to define a finger receiving opening for receiving the fingers of the user;
  - (iii) a generally cylindrically shaped upstanding pour spout connected to said base proximate said first leg of said handle, said pour spout being in alignment with a opening provided in said top.

12. A bottle cap assembly as defined in claim 11 in which said pour spout extends upwardly at an obtuse angle with respect to said top wall of said closure member.

13. A bottle assembly as defined in claim 11 in which said combination handle and pour spout further includes a generally triangular shaped reinforcement panel disposed between said pour spout and said first leg of said first generally "U" shaped member.

14. A bottle assembly as defined in claim 13 in which said combination handle and pour spout further comprises a second generally "U" shaped member connected to said base and circumscribing said first "U" shaped member and said reinforcement panel.

15. A bottle assembly as defined in claim 14 in which said second generally "U" shaped member includes first and second legs connected to a bight member said first leg being curved outwardly and terminating proximate said pour spout.

16. A bottle assembly as defined in claim 15 in which both said closure member and said combination handle and pour spout are formed from an injection moldable plastic material.

17. A bottle cap as defined in claim 16 in which said base of said combination handle and pour spout assembly is bonded to said top wall of said closure member.

* * * * *